United States Patent
Lauk et al.

(10) Patent No.: US 6,548,978 B1
(45) Date of Patent: Apr. 15, 2003

(54) SUPPRESSION CIRCUIT

(75) Inventors: Detlef Lauk, Renchen (DE); Michael Haerer, Buehlertal (DE); Andreas Wiegert, Kappelrodeck (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/806,898

(22) PCT Filed: Oct. 1, 1999

(86) PCT No.: PCT/DE99/03158

§ 371 (c)(1),
(2), (4) Date: Jul. 9, 2001

(87) PCT Pub. No.: WO00/21182

PCT Pub. Date: Apr. 13, 2000

(30) Foreign Application Priority Data

Oct. 5, 1998 (DE) .......................... 198 45 862

(51) Int. Cl.⁷ ..................... G05B 5/00; H02H 7/08; H02P 1/00; H02P 3/00; H02P 7/00
(52) U.S. Cl. ................. 318/460; 318/DIG. 2; 455/307; 375/285; 361/56
(58) Field of Search .............. 318/460, DIG. 2; 455/307; 375/285, 278, 284; 128/901; 361/56, 111, 118

(56) References Cited

U.S. PATENT DOCUMENTS

| | | | | |
|---|---|---|---|---|
| 3,372,285 A | * | 3/1968 | Blazek et al. ............. | 361/56 |
| 3,878,436 A | * | 4/1975 | Bogel ........................ | 361/72 |
| 4,455,586 A | * | 6/1984 | McCartney ................. | 361/56 |
| 4,630,163 A | * | 12/1986 | Cooper et al. ............. | 361/56 |
| 4,795,951 A | * | 1/1989 | Gaebel et al. ............. | 318/293 |
| 5,136,455 A | * | 8/1992 | Billingsley ................. | 361/56 |
| 5,194,769 A | * | 3/1993 | Ade et al. .................. | 310/51 |
| 6,381,153 B1 | * | 4/2002 | Brussels .................... | 363/39 |

FOREIGN PATENT DOCUMENTS

| | | | |
|---|---|---|---|
| DE | 39 30 539 | 3/1991 | |
| DE | 296 19 780 | 3/1998 | |
| EP | 726188 A1 | * 8/1996 | ............. B60S/1/08 |
| GB | 2256982 A | * 12/1992 | ............. B60S/1/08 |

* cited by examiner

Primary Examiner—Robert E. Nappi
Assistant Examiner—Edgardo San Martin
(74) Attorney, Agent, or Firm—Kenyon & Kenyon

(57) ABSTRACT

A suppression circuit, in particular for suppressing the noise of the wiper motor of a motor-vehicle, is provided with at least two capacitors (4, 5), which are situated between one common (1) terminal and two separate terminals (2, 3), and it is provided with pulse limitation. For purposes of pulse limitation, each capacitor has connected to it in parallel the series circuit composed of the cathode-anode path of a diode (6, 7) and of the anode-cathode path of a Zener diode (8). The suppression circuit according to the present invention, in one advantageous application, can be embedded as a suppression module in a suppression device, which is provided in a capacitor enclosure. The capacitor enclosure has three contact terminals, which stand in a fixed spatial relationship to each other, irrespective of the number of suppression components, and it can be block-like or cuboid in shape.

6 Claims, 1 Drawing Sheet

SUPPRESSION CIRCUIT

BACKGROUND INFORMATION

Figure 1:
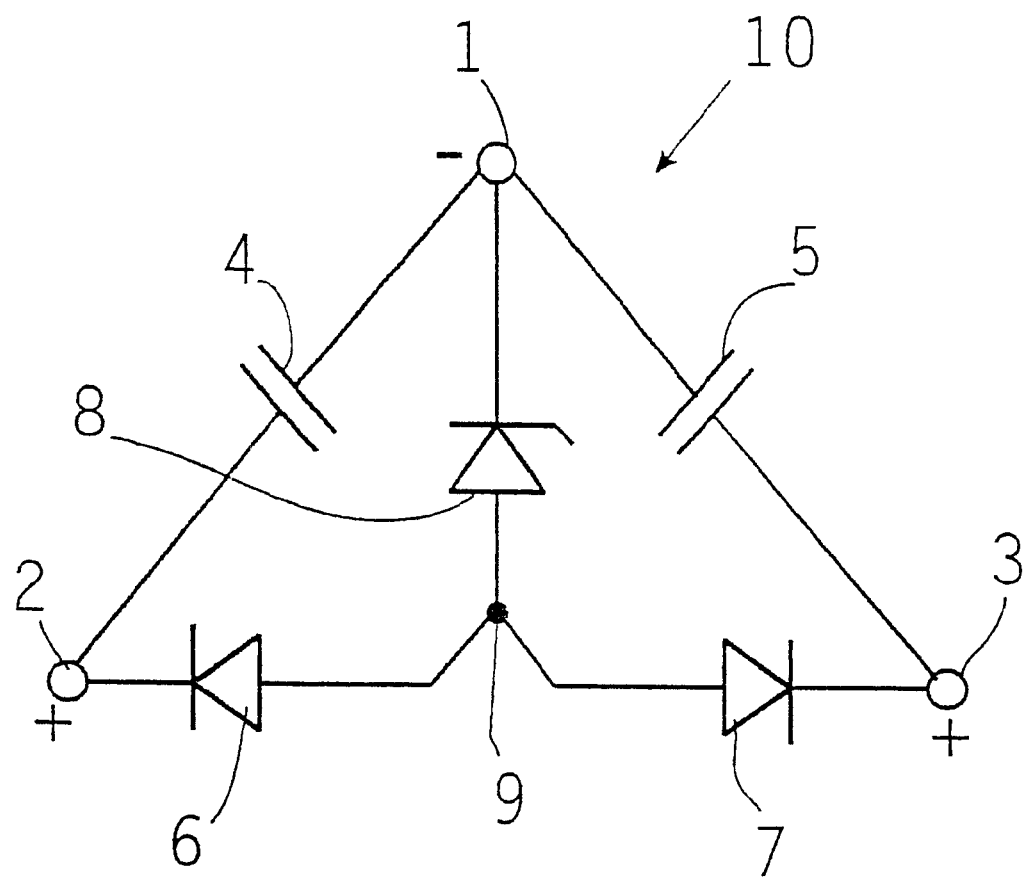

The present invention relates to a suppression circuit, in particular for suppressing the noise of the wiper motor of a motor vehicle, the suppression circuit being provided with at least two capacitors, which are situated between one common terminal and two separate terminals, it also being provided with pulse limitation, of the species defined in the preamble of claim 1.

From the German Design Patent 2 96 19 780.7, a suppression device is known for suppressing the noise of the wiper motor of a motor vehicle. In this context, the suppression circuit contains two capacitors, which are situated between one common and two separated terminals. Furthermore, to improve the suppression, pulse limitation is provided, which is realized by a varistor parallel to each capacitor.

A varistor is a relatively expensive component requiring considerable space. It is known that the limiting function of the varistor, with respect to the positive and negative voltage pulses, can also be realized by an anti-serial circuit arrangement having two Zener diodes. Components of this type combined in one enclosure are known and are available as bidirectional Zener diodes. However, as a result of the comparatively low quantities in comparison with standard, conventional components, such as diodes and Zener diodes, their price is disproportionately high.

ADVANTAGES OF THE INVENTION

In contrast, the suppression circuit according to the present invention, in particular for suppressing the noise of the wiper motor of a motor vehicle, having the characterizing features of claim 1, has the advantage of making available a simple and reliable solution in which the costs are reduced and lower space requirements are achieved. The number of soldering or welding points, of points of connection generally, is small, so that in addition to the advantage of using cost-effective components such as Zener diodes and diodes, the advantage of a simpler production process is also achieved. As a result of the fact that the number of points of connection is reduced, the sources of errors arising in soldering or welding are also significantly reduced.

In the suppression circuit according to the present invention, for the general purpose of pulse limitation, the series circuit composed of the cathode-anode path of a diode and the anode-cathode path of a Zener diode is connected in parallel to each capacitor. In this context, for use in a motor, the component facing the negative terminal clamp is the Zener diode having its cathode. With respect to the positive terminal clamp, the blocking effect of a simple diode is exploited, the cathode of the diode being connected to the terminal.

As result of the measures laid down in the further claims, advantageous refinements and improvements of the suppression circuit indicated in claim 1 are possible.

According to one particularly expedient refinement of the present invention, it is provided that the anodes of the diodes and of the Zener diode are connected together at one point.

In one preferred, advantageous embodiment of the suppression circuit according to the present invention, in using two capacitors, a single Zener diode is provided for both parallel circuits. In this manner, a version is created that is very simple and, in practice, very cost-effective and space-saving.

In one particularly advantageous and expedient refinement of the present invention, it is embedded, as a suppression module, in a suppression device, which is provided in a capacitor enclosure. In accordance with one advantageous embodiment of this refinement of the present invention, the capacitor enclosure has three contact terminals, which stand in a fixed spatial relationship to each other, irrespective of the number of suppression components. In a further embodiment, the capacitor enclosure has a block-like or cuboid shape.

DRAWING

The present invention is discussed in greater detail in the following description on the basis of the exemplary embodiment depicted in the drawing. The single Figure, in a block diagram, schematically depicts the design of the suppression circuit according to the present invention.

DESCRIPTION OF THE EXEMPLARY EMBODIMENT

In FIG. 1, the design of the suppression circuit according to the present invention is given a schematic representation. The suppression module, designated as reference numeral 10, has three terminals 1, 2, and 3. At terminal 1, for example, a negative potential is applied, and at terminals 2 and 3 a positive potential. Between terminals 1 and 2, as well as between 1 and 3, in each case, one capacitor 4, 5, respectively, is arranged. According to the present invention, for the purpose of pulse limitation, parallel to each capacitor 4 and 5, the series circuit is connected in parallel made of the cathode-anode path of a diode 6 and 7, respectively, and of the anode-cathode path of a Zener diode 8. The anodes of diodes 6 and 7 and of Zener diode 8 are connected together at one point 9.

In the depicted example, only one single Zener diode 8 is provided. This saves on one separate Zener diode. However, it is possible, and in some cases necessary or advantageous, to connect, in each case, a complete series circuit composed of two components, diode and Zener diode, in parallel to one capacitor. In this context, it is then advantageous, but not absolutely necessary, to connect the anodes of the diodes and of the Zener diodes at one point. It is also possible to insert a separate capacitor between both terminals 2 and 3, in order to increase the suppression effect, if desired. This is not depicted in FIG. 1.

According to one especially advantageous and expedient refinement of the present invention, it is embedded as a suppression module in a suppression device, which is provided in a capacitor enclosure. In an advantageous embodiment of this refinement of the present invention, the capacitor enclosure has three contact terminals, which stand in a fixed spatial relationship to each other, irrespective of the number of suppression components. The capacitor enclosure is advantageously block-like or cuboid in shape.

This embodiment, and use, of the suppression circuit according to the present invention, not depicted in the Figure, brings with it further production-technical simplifications and economies.

What is claimed is:

1. A suppression circuit for suppressing a noise of a wiper motor of a motor vehicle, comprising:

one common terminal;

two separate terminals;

at least two capacitors situated between the one common terminal and the two separate terminals; and a series circuit including a cathode-anode path of a diode and an anode-cathode path of a Zener diode, the series circuit being connected in parallel to each of the capacitors, for providing a pulse limitation.

2. The suppression circuit according to claim 1, wherein anodes of the diode and of the Zener diode are connected together at one point.

3. The suppression circuit according to claim 1, wherein the at least two capacitors include only two capacitors and wherein the Zener diode includes only one Zener diode.

4. The suppression circuit according to claim 1, wherein the suppression circuit is embedded as a suppression module in a suppression device situated in a capacitor enclosure.

5. The suppression circuit according to claim 4, wherein the capacitor enclosure has three contact terminals, which stand in a fixed spatial relationship to each other, irrespective of a number of suppression components.

6. The suppression circuit according to claim 4, wherein the capacitor enclosure is one of block-like and cuboid in shape.

* * * * *

UNITED STATES PATENT AND TRADEMARK OFFICE
CERTIFICATE OF CORRECTION

| | | |
|---|---|---|
| PATENT NO. | : 6,548,978 B1 | Page 1 of 2 |
| APPLICATION NO. | : 09/806898 | |
| DATED | : April 15, 2003 | |
| INVENTOR(S) | : Lauk et al. | |

It is certified that error appears in the above-identified patent and that said Letters Patent is hereby corrected as shown below:

On the face of the patent, # (57) Abstract, line 3, delete "(4, 5)"

On the face of the patent, # (57) Abstract, line 4, delete "(1)"

On the face of the patent, # (57) Abstract, line 4, delete "(2, 3)"

On the face of the patent, # (57) Abstract, line 8, delete "(6, 7)"

On the face of the patent, # (57) Abstract, line 8, delete "(8)"

On the face of the patent, # (57) Abstract, line 9, delete "according to the present invention"

Column 1, line 1, change "BACKGROUND INFORMATION" to -- FIELD OF THE INVENTION--.

Column 1, line 10, delete " ,of the species defined in the preamble of Claim 1"

Column 1, line 11, insert "BACKGROUND INFORMATION".

Column 1, line 12, change "From the German Design Patent" to -- German Design Patent--.

Column 1, line 12, change "2 96 19 780.7," to --No. 2 96 19 780.7 shows--

Column 1, line 25, change "enclosure" to --enclosure (housing)--

Column 1, line 30, change "ADVANTAGES OF THE INVENTION" to -- SUMMARY OF THE INVENTION--

Column 1, line 32, change "In contrast, the suppression circuit" to -- The suppression circuit--

Column 1, lines 34-35 change "vehicle, having the characterizing features of claim 1, has" to --vehicle, has--

Column 1, line 55, delete "As result of... claim 1 are possible."

Column 2, line 12, change "DRAWING" to --BRIEF DESCRIPTION OF THE DRAWING--

UNITED STATES PATENT AND TRADEMARK OFFICE
CERTIFICATE OF CORRECTION

PATENT NO. : 6,548,978 B1
APPLICATION NO. : 09/806898
DATED : April 15, 2003
INVENTOR(S) : Lauk et al.

It is certified that error appears in the above-identified patent and that said Letters Patent is hereby corrected as shown below:

Column 2, line 14, change "The present invention is discussed in greater detail in the following description on the basis of the exemplary embodiment depicted in the drawing. The single figure" to --Figure 1,--

Column 2, line 20, change "DESCRIPTION OF THE EXEMPLARY EMBODIMENT" to --DETAILED DESCRIPTION--

Signed and Sealed this

Twenty-first Day of November, 2006

JON W. DUDAS
*Director of the United States Patent and Trademark Office*